United States Patent

Johnson et al.

[11] Patent Number: 5,491,489
[45] Date of Patent: Feb. 13, 1996

[54] ASR SYSTEM FOR MICROBURST DETECTION

[75] Inventors: Robert E. Johnson, Canoga Park; Gregory G. Charlton, Reseda; William G. Sterns, West Hills; Ching-Fai Cho, Tujunga, all of Calif.

[73] Assignee: ITT Corporation, New York, N.Y.

[21] Appl. No.: 740,990

[22] Filed: Aug. 6, 1991

[51] Int. Cl.⁶ .................................................. H01Q 13/00
[52] U.S. Cl. ............................................. 343/779; 343/853
[58] Field of Search ...................... 343/853, 858, 343/779; 342/368; 333/111

[56] References Cited

U.S. PATENT DOCUMENTS

| | | |
|---|---|---|
| Re. 33,152 | 1/1990 | Atlas . |
| 2,913,723 | 11/1959 | Thourel . |
| 3,801,932 | 4/1974 | Goldie ..................................... 333/111 |
| 4,342,997 | 8/1982 | Evans ...................................... 343/853 |
| 4,449,128 | 5/1984 | Weir ........................................ 343/858 |
| 4,451,832 | 5/1984 | Stites ....................................... 343/858 |
| 4,845,507 | 7/1989 | Archer et al. ............................ 343/853 |

OTHER PUBLICATIONS

Patent Abstracts Of Japan vol. 6, 103(E-112)(981) 12 Jun. 1982 & JP-A-57 033 804 (Nippon).

*Primary Examiner*—Rodney B. Bovernick
*Assistant Examiner*—Robert E. Wise
*Attorney, Agent, or Firm*—Plevy & Associates; Patrick M. Hogan

[57] ABSTRACT

A high gain antenna that produces a pencil beam along the ground and a lower gain antenna that produces a beam extending above the pencil beam are coupled to a source of r.f. pulses so that the amplitude of the r.f. pulses applied to the high gain antenna is less than the amplitude of the r.f. pulses applied to the lower gain antenna during airplane detection and the full amplitude of the r.f. pulses during a pulse segment is applied to the high gain antenna during wind pattern detection.

21 Claims, 6 Drawing Sheets

ASR SYSTEM FOR MICROBURST DETECTION

FIELD OF THE INVENTION

This application relates, in general, to radar systems and, more particularly, to an airport surveillance radar (ASR) capable of microburst detection.

BACKGROUND OF THE INVENTION

Although wind gusts and air turbulence have long been known to present hazards to aircraft during takeoff and landing, attention has more recently been directed to rapid changes in wind velocity known as wind shear. One particularly hazardous form of wind shear can occur during thunderstorm activity when cool upper air flows downward in a column so as to create a pattern of radially outflowing air when it strikes the ground. This phenomenon is known as a microburst. When a low altitude aircraft passes through this pattern, as might occur during takeoff or landing, it successively encounters a head wind, a down draft, and a tail wind. The abrupt switch from head wind to tail wind causes the plane to lose air speed, and thus lift, which may cause it to crash before effective corrective action can be taken.

At major airports, high powered search radars or airport surveillance radars (ASR) are used for detecting the location of aircraft, and special Terminal Doppler Weather Radars (TDWR) are used for the purpose of detecting the presence of dangerous wind patterns, in the rain. Nearly all commercial airports require the use of an ASR for air traffic control. Unfortunately, however, the added weather radars are beyond the financial reach of a large number of smaller airports.

Accordingly, efforts have been made to provide added function to the existing search radar, ASR, so that it can also detect dangerous wind patterns. U.S. Pat. No. 4,649,398 describes how special signal processing may be added to an existing ASR to detect wind patterns such as a microburst event. The ASR antenna has two medium gain, vertically displaced, but overlapping beams in space. Electromagnetic waves are radiated by the lower beam, and the Doppler spectra of the received signals on both beams are processed so as to generate signals synthetically representing wind patterns occurring at low elevation. Various modes of operation are suggested: subtraction of Doppler spectra related to the upper beam from the Doppler spectra of the lower beam; determination of the ratio of the spectra and derivation of their mean value. This process can detect wet microburst events (those containing a considerable amount of rain) but is inhibited from detecting the equally dangerous dry microburst events (those containing very little rain) by the instabilities of the high power klystron transmitter. These instabilities limit the subclutter visibility of the radar system and thereby limit the ability to detect the small radar cross section of the moving dry microburst when it is in the presence of the much greater stationary ground clutter.

Solid-state transmitters are available that have the necessary stability to provide sufficient subclutter visibility for the detection of the dry microburst event, as well as having advantages in reliability, maintainability, safety, and support cost. Although practical solid-state transmitters can generate average power equal to or greater than the klystrons in use, solid-state transmitters tend to be limited by economic practicality to providing radiated waveforms that are lower in peak power, but longer in pulse duration. When a segment of this lower peak power, solid-state waveform is used in conjunction with the existing medium gain antennas, insufficient signal to noise ratio is obtained for achieving a high probability of detecting the very low level dry microburst event.

The subject invention provides a practical means for detecting the dry microburst event, while obtaining the several other benefits of using a solid-state transmitter.

SUMMARY OF THE INVENTION

In one embodiment of this invention, an antenna is used that radiates a high gain pencil beam along the ground for detection of low altitude aircraft and wind patterns and a lower gain broader beam with CSC shaping for detection of high level aircraft. Controllable relative amounts of electromagnetic wave energy are coupled by a variable coupler from a source of pulsed r.f. waves to the antennas. When operated in an aircraft search or detection mode, energy of the main pulse compression waveform is coupled to both antennas, and when operated in a wind pattern detection mode, all of the energy of a short duration segment of the waveform is preferably coupled to the antenna producing the pencil beam. The relative phasing of the electromagnetic waves coupled to the antennas during the search mode is such that the electromagnetic waves in their respective beams are additive, thereby preventing any nulls from occurring in the region of overlap.

It is also preferable that the coupling be such that each antenna has equal range detection performance. At long search ranges it is customary to use longer higher power pulses of electromagnetic waves than are used at short ranges, and since wind patterns of interest are at short ranges, it is preferable to use the shorter pulses when operating in a wind pattern detection mode.

The radar of this invention combines the beams from the antennas so as to obtain efficient operation when in the aircraft search mode and concentrates all the electromagnetic energy into a low level pencil beam when in a wind pattern detection mode so as to detect wind patterns in dry air. Rapid alternation or frequency multiplexing between modes provides substantially continuous information for each.

DETAILED DESCRIPTION OF THE FIGURES

Figures 1A, 1B:
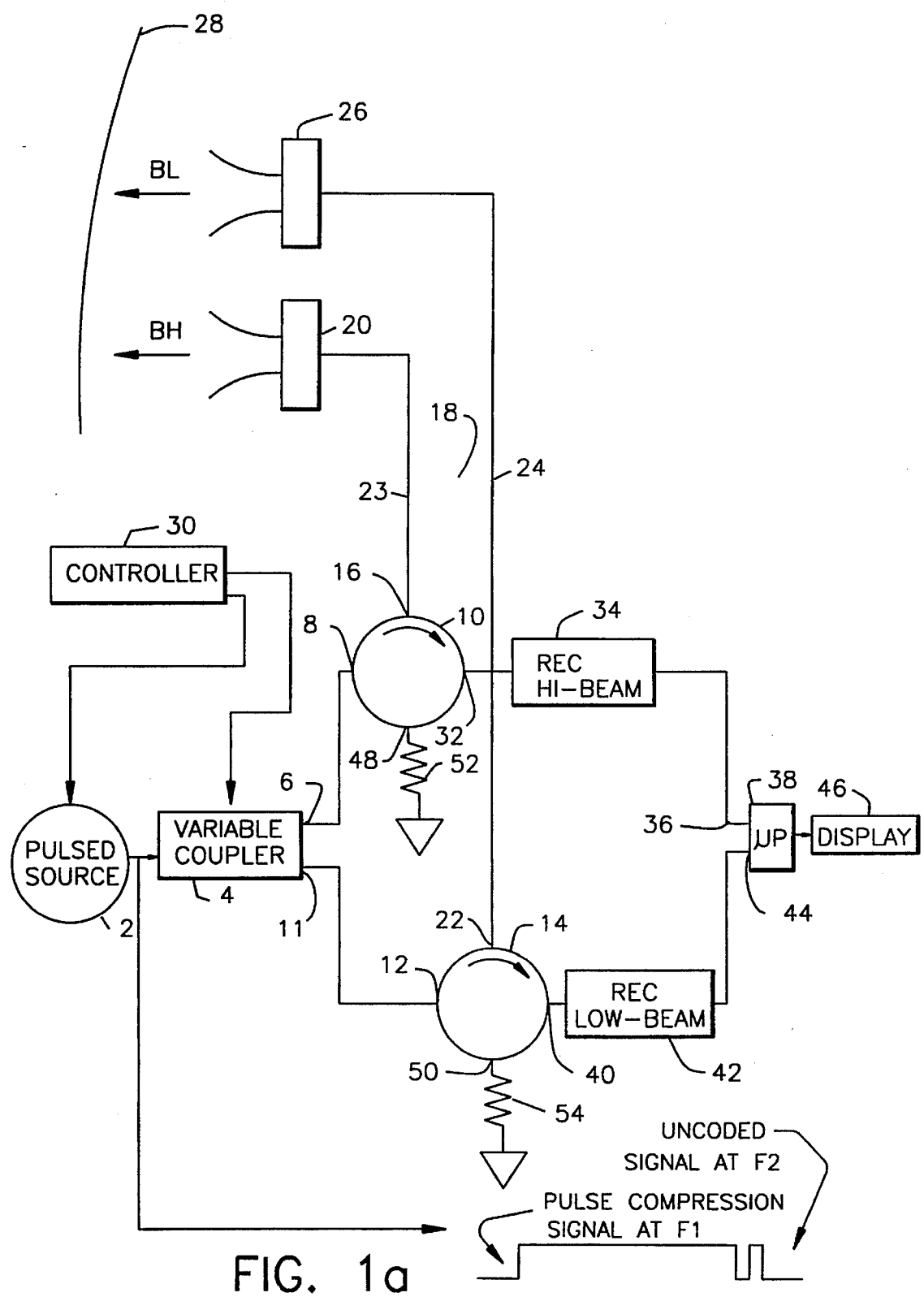
FIG. 1a is a block diagram of a radar system incorporating the invention.
FIG. 1b is a typical waveform that may be radiated by a radar system incorporating the invention.
Figure 4:
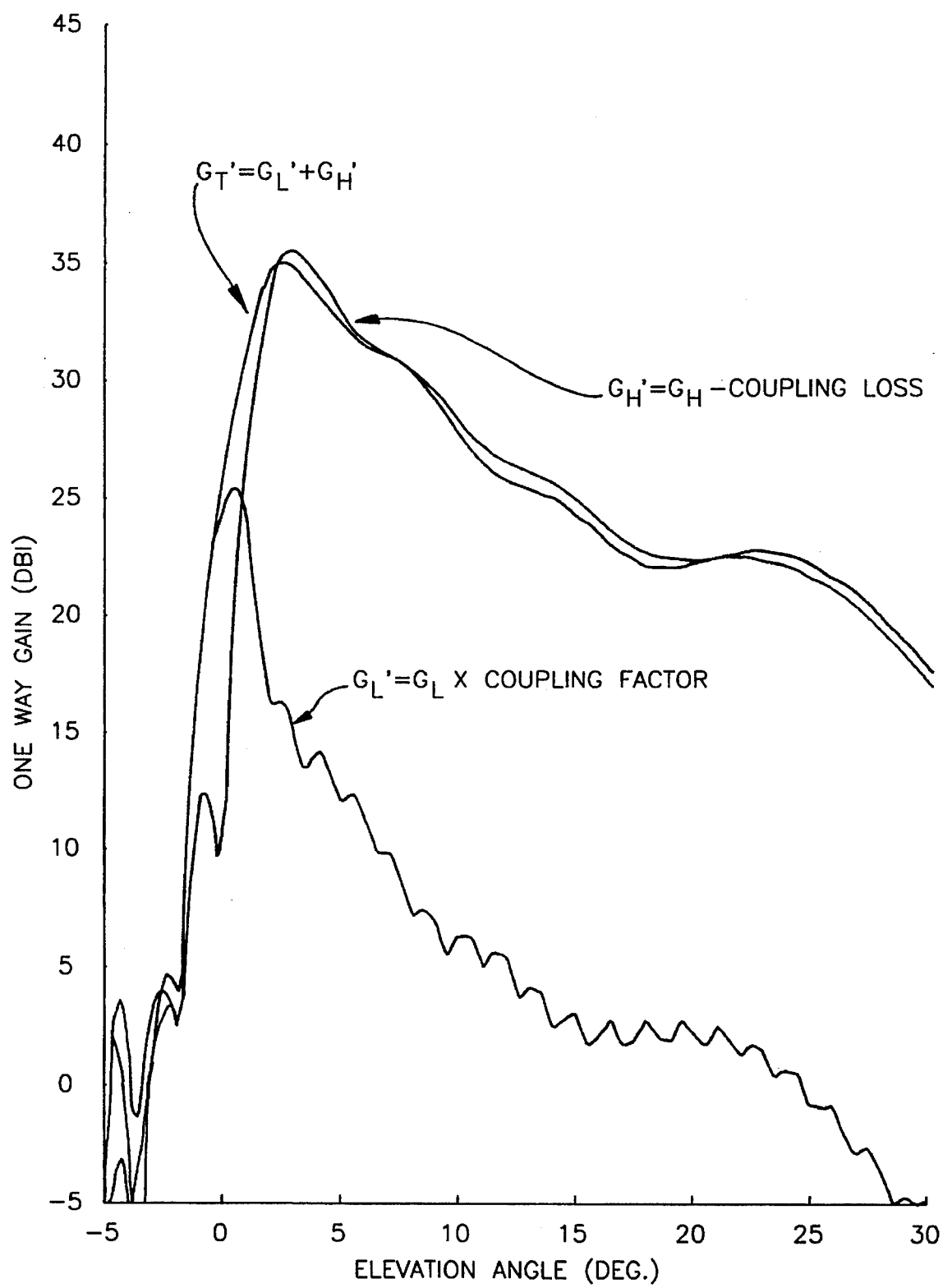
FIG. 4 is a graphical illustration of the method by which a third transmit beam is generated from the two antenna beams of FIG. 3.

In the block diagram of FIG. 1 of a system for detecting aircraft and wind patterns in accordance with the invention, a source 2 of pulsed r.f. electromagnetic waves is coupled to a variable r.f. coupler 4. A typical output waveform for source 2 is shown in FIG. 1b. During the longer pulse compression signal of the output waveform, an output 6 of the coupler 4 is connected to a port 8 of a four port ferrite circulator 10, and an output 11 is connected to a port 12 of a four port ferrite circulator 14. The directions of signal flow in the circulators are indicated by the arrows. A port 16 of the circulator 8 is coupled to an antenna horn 20 that produces a beam having a $CSC^2$ vertical pattern, and a port 22 of the circulator 14 is coupled to an antenna horn 26 for producing a pencil beam. The beams are reflected by a reflector 28 and combine in space to form a third beam, $G_T'$ as illustrated in FIG. 4. The relative phases of the electromagnetic waves coupled to the antenna feed horns 20 and 26, are matched by equal length transmission lines 23 and 24 so that interference nulls are not created in the far field antenna pattern, $G_T$.

A controller 30 sets the duration of the r.f. pulses from the source 2 and also sets the variable r.f. coupler 4 so as to supply predetermined relative amounts of r.f. power to the circulators 10 and 14 during the pulse compression part of the waveform for an aircraft detection mode and, preferably, all of the r.f. power to the circulator 14 during the uncoded part of the waveform for a wind pattern detection mode.

Reflections of r.f. pulses that reach the horn antenna 20 are conducted to the port 16 of the circulator 10 and exits therefrom at a port 32. A high beam receiver 34 is coupled between the port 32 and an input 36 of a signal processor 38. Reflections of r.f. pulses that reach the horn 26 are conducted to the port 22 of the circulator 14 and exit therefrom at a port 40. A low beam receiver 42 is connected between the port 40 and an input 44 of the signal processor 38. In order to avoid reflections that would otherwise occur at the fourth ports 48 and 50 of the circulators 10 and 14, they are respectively terminated by characteristic impedances 52 and 54. The low beam receiver 42 separately detects the two parts of the transmitted waveform. Input 44 may either be time multiplexed between the two parts of the waveform or may be two separate inputs to the processor 38. The processor has separate channels within it to process both target and weather information simultaneously. Both target and weather processes are based on Doppler processing; in the first instance to detect moving point targets to the exclusion of stationary ground clutter, and in the second instance, to map the amplitude and velocity of moving rain clouds that may be present. In either case, the processed signals are displayed on display group 46. Both target and weather data may be presented on the several operational air traffic control displays of 46, or auxiliary displays may be used in conjunction with the operational displays to show the weather in more detail than may be desirable on the operational displays. In either case, the processed signals are displayed by a display group 46. The processor 38 may include a fast Fourier Transform, FFT, for deriving the spectra of wind velocity components flowing toward and away from the antennas at successive ranges. At each range, the amplitudes and signs of the frequency bins produced by the FFT are displayed by the means 46. Typically, weather information is displayed in an abbreviated format on the operational displays, so as not to overload the displays with too much information, or a more detailed auxiliary weather display is presented in two parts; one part in which the rain amplitude is encoded into color, and a second part in which the rain velocity is encoded into color.

Figure 3:
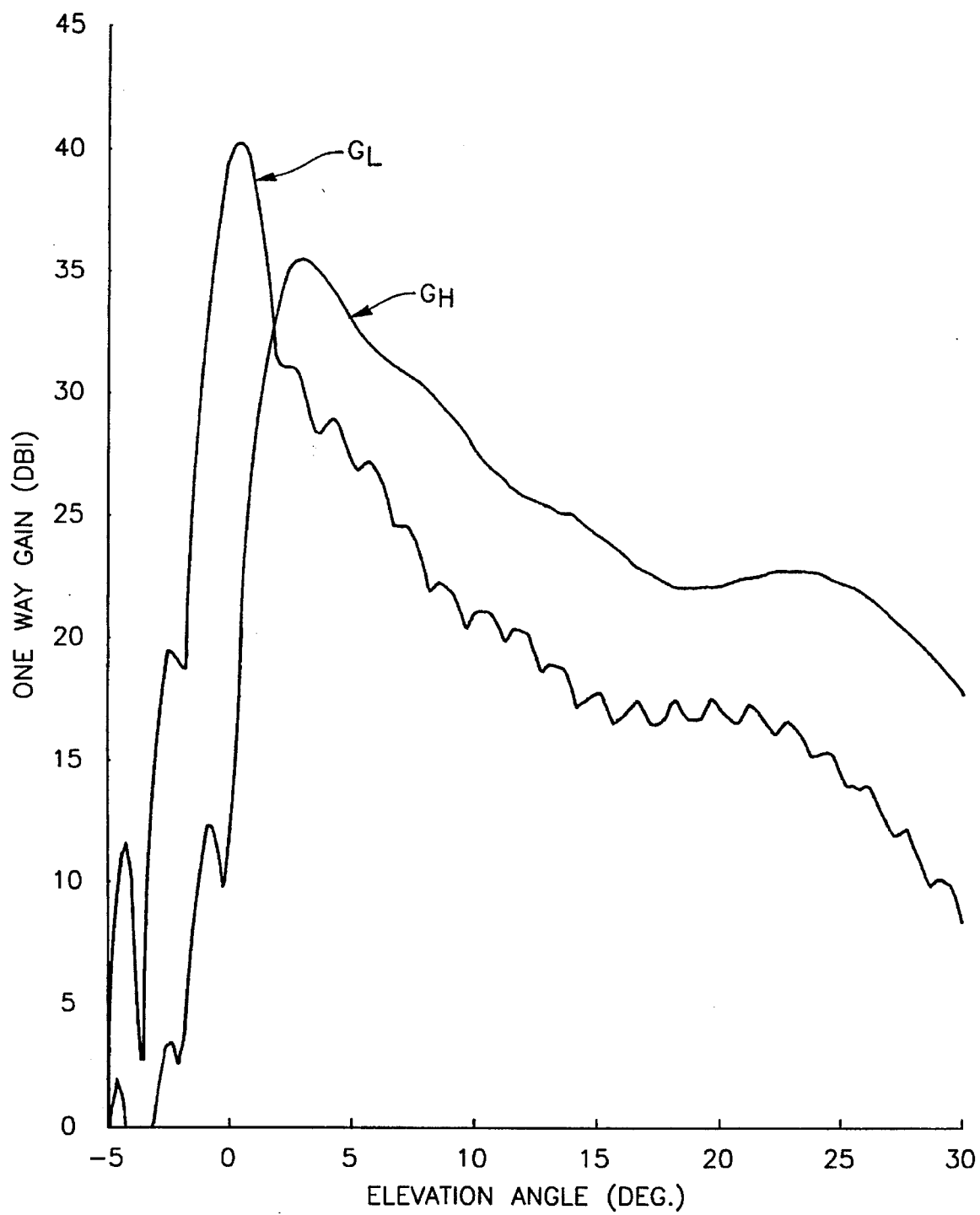
FIG. 3 is a graphical illustration of suggested gains of the two antenna beams formed by the antenna horns of FIG. 1.

During an aircraft detection mode using the pulse compression pulse, the variable coupler 4 supplies most of the energy in the r.f. pulses from the source 2 to the lower gain antenna horn 20 that produces the $CSC^2$ beam $G_H$ illustrated in FIG. 3, and the rest of the energy is supplied by the coupler 4 to the higher gain antenna horn 26 that produces the pencil beam $G_L$ of FIG. 3. When the antenna horns 26 and 20 are energized by r.f. pulses of differing amplitudes determined by the setting of the variable coupler 4, the radiation patterns may be as indicated by GH' and GL' of FIG. 4. Note that GH' has a greater peak amplitude than GL'. The transmission path length is adjusted so that the electromagnetic waves in the patterns GH' and GL' reinforce each other at the crossover points, rather than creating nulls, so as to generate a transmitted pattern identified as GT' that is a composite of GH' and GL'.

Figure 2:
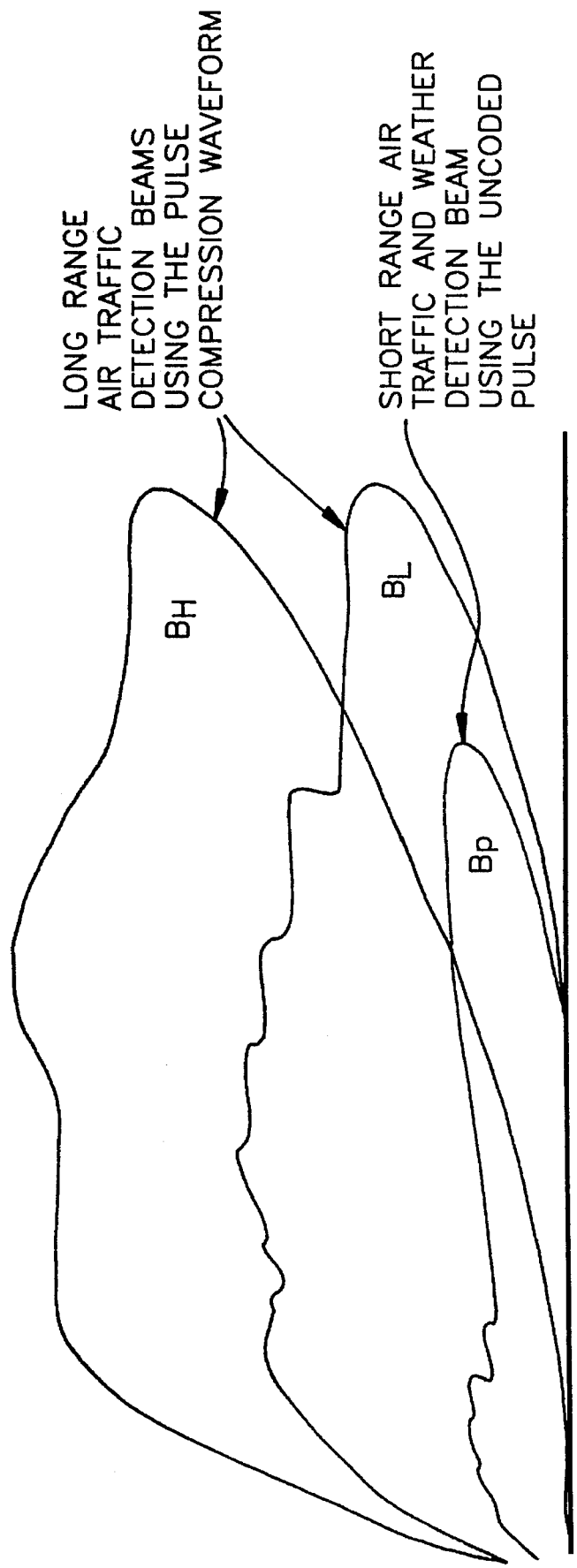
FIG. 2 is a graphical illustration of a typical radar coverage profile of a radar system incorporating the invention.
Figure 5:
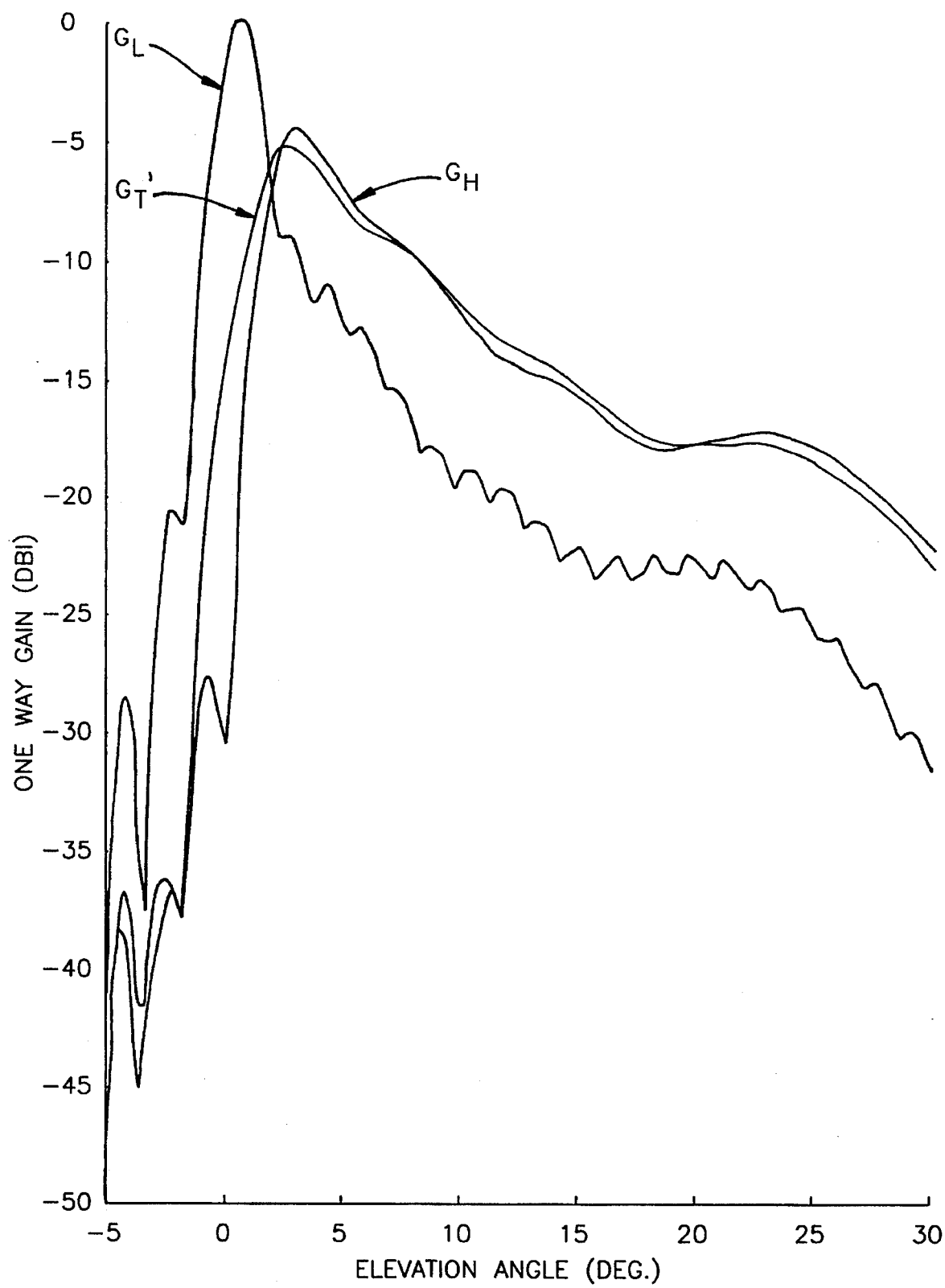
FIG. 5 is a graphical illustration of the relative gains of the three beams used for long range air traffic detection. The system transmits on $G_T$, then has separate receiver channels connected to $G_L$ and $G_H$.
Figure 6:
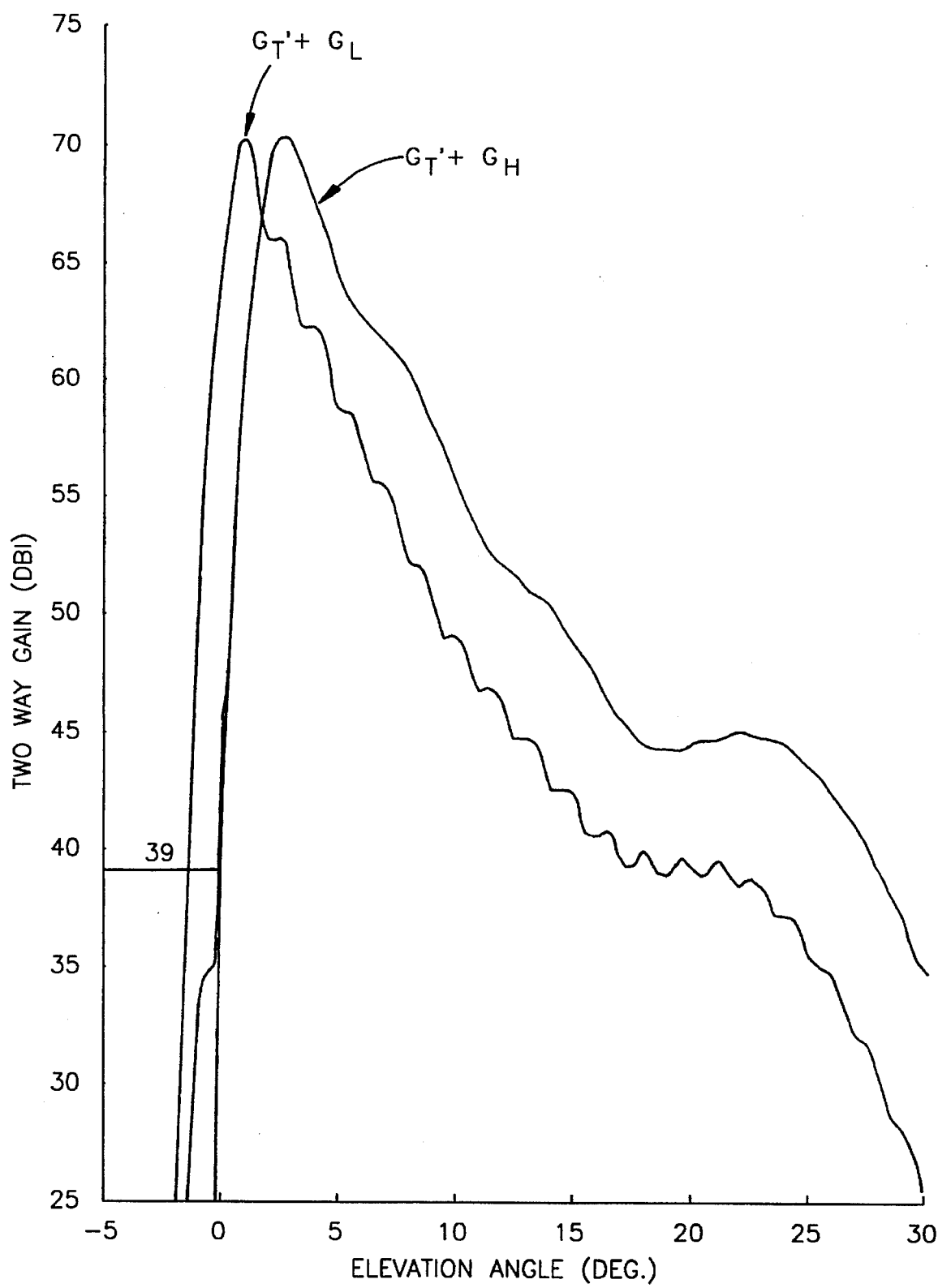
FIG. 6 is a graphical illustration of the energy patterns representing the net effect of transmitting on $G_T$ then separately receiving on $G_L$ and $G_H$ when the coupling of electromagnetic energy to them is such that they have equal range detection performance.

FIG. 5 illustrates the transmit pattern GT' relative to the reception patterns, GL and GH of FIG. 3, of the two horn antennas 26 and 20. The coupling by the variable coupler 4 is selected such that equal range detection performance is attained from the beams BL and BH of FIG. 2, i.e., the relative amounts of r.f. coupled to the antenna horns 20 and 26 are such that the overall peak gains for combined transmission and reception are the same. This means that the maximum value of GT'+ GL equals the maximum value of GT'+GH as illustrated in FIG. 6. Thus, the peak transmit/receive gains of the antennas are the same.

We claim:

1. Apparatus for use in detecting aircraft and for detecting the pattern of low level wind velocity including:

first means for providing a first antenna beam for directing electromagnetic waves along a given direction;

second means for providing a second antenna beam for directing a beam of electromagnetic waves at an angle with respect to said given direction, said second antenna beam having less gain than said first antenna beam;

a source of pulsed electromagnetic waves;

means for coupling electromagnetic waves from said source to said antenna beams; and means for controlling said means for coupling electromagnetic waves from said source to said first and second antenna beams in such manner that more energy is coupled to said second antenna beam than to said first antenna beam when the apparatus is in an aircraft detection mode and that more energy is coupled to said first antenna beam than to said second antenna beam when the apparatus is in a wind pattern detection mode.

2. Apparatus as set forth in claim 1, further including:

means for making the pulses of electromagnetic waves from said source have a longer duration when the apparatus is operating in an aircraft detection mode than when it is in a wind pattern detection mode.

3. Apparatus as set forth in claim 1, wherein said means for controlling said means for coupling electromagnetic energy from said source to said first and second antenna beams couples all of said electromagnetic energy to said first antenna beam when the apparatus is in a wind pattern detection mode.

4. Apparatus as set forth in claim 1, wherein said means for controlling said means for coupling electromagnetic waves to said first and second antenna beams makes the peak transmit/receive gains of the antenna beams the same.

5. Apparatus according to claim 1, wherein said first means includes an antenna for producing a pencil beam.

6. The apparatus according to claim 5, wherein said antenna is a horn antenna.

7. The apparatus according to claim 1, wherein said second means includes an antenna for producing a beam having a $CSC^2$ vertical pattern.

8. The apparatus according to claim 7, wherein said antenna is a horn antenna.

9. The apparatus according to claim 1, further including reflector means for reflecting said first and second antenna beams to form a fluid combined beam.

10. Apparatus for use in detecting the presence of aircraft and for use in detecting wind patterns, comprising:

first means for providing a first antenna beam for radiating a narrow beam of electromagnetic waves;

second means for providing a second antenna beam for radiating a beam of electromagnetic waves that is broader than said first beam and which extends above it;

a source of energy in the form of r.f. pulses; and means for coupling less r.f. energy from said source to said first antenna beam than to said second antenna beam when the apparatus is in an airplane detection mode so that the maximum combined gain for the transmission of pulses and the reception of reflections of the pulses is the same for said first and second antenna beams and for coupling all of the r.f. energy to said first antenna beam when the apparatus is in a wind pattern detection mode.

11. The apparatus according to claim 10, wherein said first means includes an antenna horn for radiating a pencil beam.

12. The apparatus according to claim 10, wherein said second means includes an antenna horn for radiating a $CSC^2$ beam.

13. Apparatus for detecting aircraft and patterns of low level wind velocity, comprising:

first means for providing a first antenna beam for directing a beam of electromagnetic waves along a given direction;

second means for providing a second antenna beam for directing a beam of electromagnetic waves at an angle with respect to said given direction, said second antenna beam having less gain than said first antenna beam;

a source of pulsed electromagnetic waves;

means for coupling electromagnetic waves from said source to said antenna beams;

means for controlling said means for coupling electromagnetic waves from said source to said first and second antennas in such manner that more energy is coupled to said second antenna beam than to said first antenna beam when the apparatus is in an aircraft detection mode and that more energy is coupled to said first antenna beam than to said second antenna beam when the apparatus is in a wind pattern detection mode;

means coupled to said antenna beams for processing the signals produced therein by reflected electromagnetic waves so as to derive signals representing the location of aircraft when the system is in an aircraft detection mode and signals representing wind borne rain velocity and amplitude when the system is in a wind pattern detection mode; and means coupled to said means for processing the signals for displaying the locations of aircraft and representations of rain amplitude and wind velocity.

14. Apparatus for detecting the presence of aircraft and for detecting wind patterns, comprising:

a first antenna beam for radiating a narrow beam of electromagnetic waves;

a second antenna beam for radiating a beam of electromagnetic waves that is broader than said first beam and which extends above it;

a source of energy in the form of r.f. pulses; and means for controlling the relative amplitudes of the r.f. pulses coupled to said antenna beams during an airplane detection mode so that the maximum combined transmission and reception gains for said first and second antenna beams is the same.

15. A method to enable the use of radar to detect aircraft as well as microburst detection, comprising the steps of:

directing a high gain antenna beam along the ground;

directing a lower gain broader beam above said high gain beam;

radiating from both beams in an aircraft detection mode; and radiating only from said high gain beam in a microburst detection mode.

16. The apparatus according to claim 15, wherein said high and low gain antennas are horn antennas including a common reflector for receiving radiation from said antennas for providing therefrom a reflected third beam.

17. The apparatus according to claim 16, wherein the phases of energy coupled to said antennas are matched so that insubstantive interference nulls are created in the for field antenna pattern.

18. A radar apparatus for detecting the presence of aircraft in a first mode and for detecting wind patterns in a second mode, comprising:

a first high gain antenna for providing a pencil beam of radiation along the ground;

a lower gain antenna for providing an antenna beam which radiates above said pencil beam;

an RF pulse source for providing a segmented pulse compression waveform having a main compression waveform portion and a short duration segment portion; and control means for applying pulse energy from said main compression waveform of said RF pulse source to said high and low gain antennas during said first mode and for applying all pulse energy of a short duration segment of the waveform to said high gain antenna during said second mode.

19. The apparatus according to claim 18, including processing means responsive to reflected energy impinging upon said antenna to process and display the information contained therein.

20. The apparatus according to claim 18, wherein during said first mode more pulse energy is supplied to said lower gain antenna than to said higher gain antenna.

21. The apparatus according to claim 18, wherein said lower gain antenna produces a beam having a $CSC^2$ vertical radiation pattern.

* * * * *